US007054657B2

(12) United States Patent
Alanärä

(10) Patent No.: US 7,054,657 B2
(45) Date of Patent: May 30, 2006

(54) BACKWARDS COMPATIBLE, EXTENDED METHOD TO EXECUTE CHECK NUMBER CALCULATION OF IMEI

(75) Inventor: Seppo Alanärä, Tokyo (JP)

(73) Assignee: Nokia Corporation, Espoo (FI)

( * ) Notice: Subject to any disclaimer, the term of this patent is extended or adjusted under 35 U.S.C. 154(b) by 88 days.

(21) Appl. No.: 09/783,917

(22) Filed: Feb. 15, 2001

(65) Prior Publication Data

US 2001/0027117 A1    Oct. 4, 2001

Related U.S. Application Data

(60) Provisional application No. 60/183,279, filed on Feb. 17, 2000.

(51) Int. Cl.
*H04M 1/00*    (2006.01)

(52) U.S. Cl. ............... 455/551; 455/414.4; 455/432.2; 455/401

(58) Field of Classification Search ........... 455/551, 455/550, 410–411, 414, 80.3, 75.1, 435, 925, 455/550.1, 432.2, 432.3, 433, 434, 435.1, 455/461, 414.1, 414.4, 439, 429; 380/281, 380/182, 277, 255; 713/168, 200, 182
See application file for complete search history.

(56) References Cited

U.S. PATENT DOCUMENTS

| | | | | |
|---|---|---|---|---|
| 4,325,117 A * | 4/1982 | Parmet et al. | ............... | 715/519 |
| 4,535,204 A * | 8/1985 | Hughes et al. | ......... | 379/357.04 |
| 5,497,412 A * | 3/1996 | Lannen et al. | ............... | 455/408 |
| 5,862,481 A * | 1/1999 | Kulkarni et al. | ............ | 455/432 |
| 5,873,043 A * | 2/1999 | Comer | ........................ | 370/474 |
| 5,945,932 A * | 8/1999 | Smith et al. | ................... | 341/51 |
| 5,991,635 A * | 11/1999 | Dent et al. | ................... | 455/517 |
| 6,076,121 A * | 6/2000 | Levine | ........................ | 709/220 |
| 6,081,534 A * | 6/2000 | Sipila | ........................ | 370/466 |
| 6,134,309 A * | 10/2000 | Carson | ................... | 379/114.11 |
| 6,266,525 B1 * | 7/2001 | Peterson | ..................... | 455/410 |
| 6,338,140 B1 * | 1/2002 | Owens et al. | ............... | 380/255 |
| 2002/0040389 A1 * | 4/2002 | Gerba et al. | ................. | 709/219 |

OTHER PUBLICATIONS

Jane Thacker, Effect of Adopting a Hexadecimal Format for the ISAN on the Method of Calculating the Check Digit, Aug. 6, 1999, ISO/TC 46/SC 9/WG 1, pp. 1-4.*
ANSI American National Standards Institute, "American National Standard for Identification Cards-Identification of Issuers-Part 1: Numbering System", (ANSI/ISO/IEC 7812-1993), 1993.

* cited by examiner

*Primary Examiner*—Pablo N. Tran
(74) *Attorney, Agent, or Firm*—Harrington & Smith, LLP

(57) ABSTRACT

A method is taught to provide an improved mobile station International Mobile Equipment Identity (IMEI) code having at least a six digit hexadecimal SNR representation, in conjunction with modifying a Check Digit calculation procedure so as to insure backwards compatibility with an existing installed base of mobile stations having a six digit BCD SNR representation.

2 Claims, 5 Drawing Sheets

Luhn formula for computing modulus 10 "double-add-double" check digit

The following steps are involved in this calculation:

Step 1: Double the value of alternate digits beginning with the first right-hand digit (low order).

Step 2: Add the individual digits comprising the products obtained in Step 1 to each of the unaffected digits in the original number.

Step 3: Subtract the total obtained in Step 2 from the next higher number ending in 0 [this is the equivalent of calculating the "tens complement" of the low order digit (unit digit) of the total]. If the total obtained in Step 2 is a number ending in zero (30, 40, etc.), the check digit is 0.

Example:

Account number without check digit  4992 73 9871

| | | | | | | | | | Steps |
|---|---|---|---|---|---|---|---|---|---|
| 4 | 9 | 9 | 2 | 7 | 3 | 9 | 8 | 7 | 1 | 1 |
|   | x2 |   | x2 |   | x2 |   | x2 |   | x2 | |
| | 18 | | 4 | | 6 | | 16 | | 2 | |

4 + 1 + 8 + 9 + 4 + 7 + 6 + 9 + 1 + 6 + 7 + 2 = 64    2

70 − 64 = 6    3

Account number with check digit  4992 73 9871 6

BACKWARDS COMPATIBLE, EXTENDED METHOD TO EXECUTE CHECK NUMBER CALCULATION OF IMEI

CLAIM OF PRIORITY FROM A COPENDING PROVISIONAL PATENT APPLICATION

Priority is herewith claimed under 35 U.S.C. §119(e) from copending Provisional Patent Application No. 60/183,279, filed Feb. 17, 2000. The disclosure of this Provisional Patent Application is incorporated by reference herein in its entirety.

FIELD OF THE INVENTION

This invention relates generally to mobile stations, including cellular telephones and personal communicators, and more particularly relates to techniques for uniquely identifying a particular mobile station.

BACKGROUND OF THE INVENTION

In the GSM system a 14 digit International Mobile station Equipment Identity (IMEI) code is defined to be stored in the mobile station. The value of the IMEI is intended to be unique for each mobile station, and is fixed during the manufacturing process. An associated check digit is calculated by a Luhn Algorithm (ISO/IEC 7812).

The IMEI is typically employed by the network operator to insure the validity of the mobile station, and the network operator will refuse service to a mobile station that does not have a valid IMEI. A purpose of the IMEI is to obtain information on the use of Public Land Mobile Network (PLMN) by subscribers for individual charging purposes.

As currently specified, the IMEI includes a six digit binary coded decimal (BCD) serial number (SNR) field, as well as a six digital type approval code (TAC) and a two digit final assembly code (FAC). However, with the explosive growth in mobile station usage, the six digits of the SNR field becomes insufficient for uniquely identifying mobile stations for large production volumes.

OBJECTS AND ADVANTAGES OF THE INVENTION

It is thus an object and advantage of this invention to provide an improved mobile station IMEI and a corresponding modification to the procedure for calculating the check digit.

It is another object and advantage of this invention to provide an improved mobile station IMEI having at least a six digit hexadecimal SNR representation, in conjunction with a check digit calculation procedure, so as to insure backwards compatibility with the existing installed base of mobile stations having the six digit BCD SNR representation.

SUMMARY OF THE INVENTION

The foregoing and other problems are overcome and the objects and advantages are realized by methods and apparatus in accordance with embodiments of this invention.

A method is disclosed to provide an improved mobile station International Mobile Equipment Identity (IMEI) code having at least a six digit hexadecimal SNR representation, in conjunction with modifying a check digit calculation procedure so as to insure backwards compatibility with an existing installed base of mobile stations having six digit BCD SNR representation.

A method is disclosed for operating a mobile station to provide the IMEI with at least a hexadecimal SNR field, and to then modify the check digit calculating procedure so that hexadecimal digits A, B, C, D, E and F are first converted to decimal digits 10, 11, 12, 13, 14 and 15, respectively, and to then compute the check bit using the original check bit calculation algorithm (Luhn Algorithm).

Alternatively, the Luhn Algorithm may be modified to use base 16 for all calculations to derive a base 16 check digit.

In a more preferred embodiment of this invention all 14 digits of the IMEI are stored in a hexadecimal representation, and the calculation of the check digit is performed over all of the 14 hexadecimal digits.

Further in accordance with this aspect of these teachings, a method is disclosed for use with a mobile station of a type that stores a 14 digit International Mobile Equipment Identity (IMEI) code for generating a Check Digit (CD). The method includes executing a preliminary step of encoding the 14 digit (D1, D2, D3, . . . , D14) IMEI in a hexadecimal representation. The method continues by computing the CD by steps of: (A) doubling the values of the odd digits (D1, D3, D5, . . . , D13) of the IMEI using the hexadecimal number base; (B) adding together the individual digits of the seven numbers obtained in Step A, and adding this sum to the sum of all of the even labeled digits (D2, D4, D6, . . . , D14) of the IMEI using the hexadecimal number base; and (C) if the number obtained at the end of Step B ends in zero (0), setting the CD to zero (0), else if the number obtained at the end of Step B does not end in zero (0), setting the CD to be the difference between that number subtracted from the next highest hexadecimal number which does end in zero (0).

This method works indiscriminately with mobile stations using a hexadecimal IMEI representation and with mobile stations using a BCD IMEI representation, thereby ensuring backwards compatibility with an installed base of mobile stations using the BCD IMEI representation.

BRIEF DESCRIPTION OF THE DRAWINGS

The above set forth and other features of the invention are made more apparent in the ensuing Detailed Description of the Invention when read in conjunction with the attached Drawings, wherein:

FIG. 6 illustrates the Luhn algorithm or formula for computing a modulus 10 check digit, in accordance with the prior art.

DETAILED DESCRIPTION OF THE INVENTION

Figure 1:
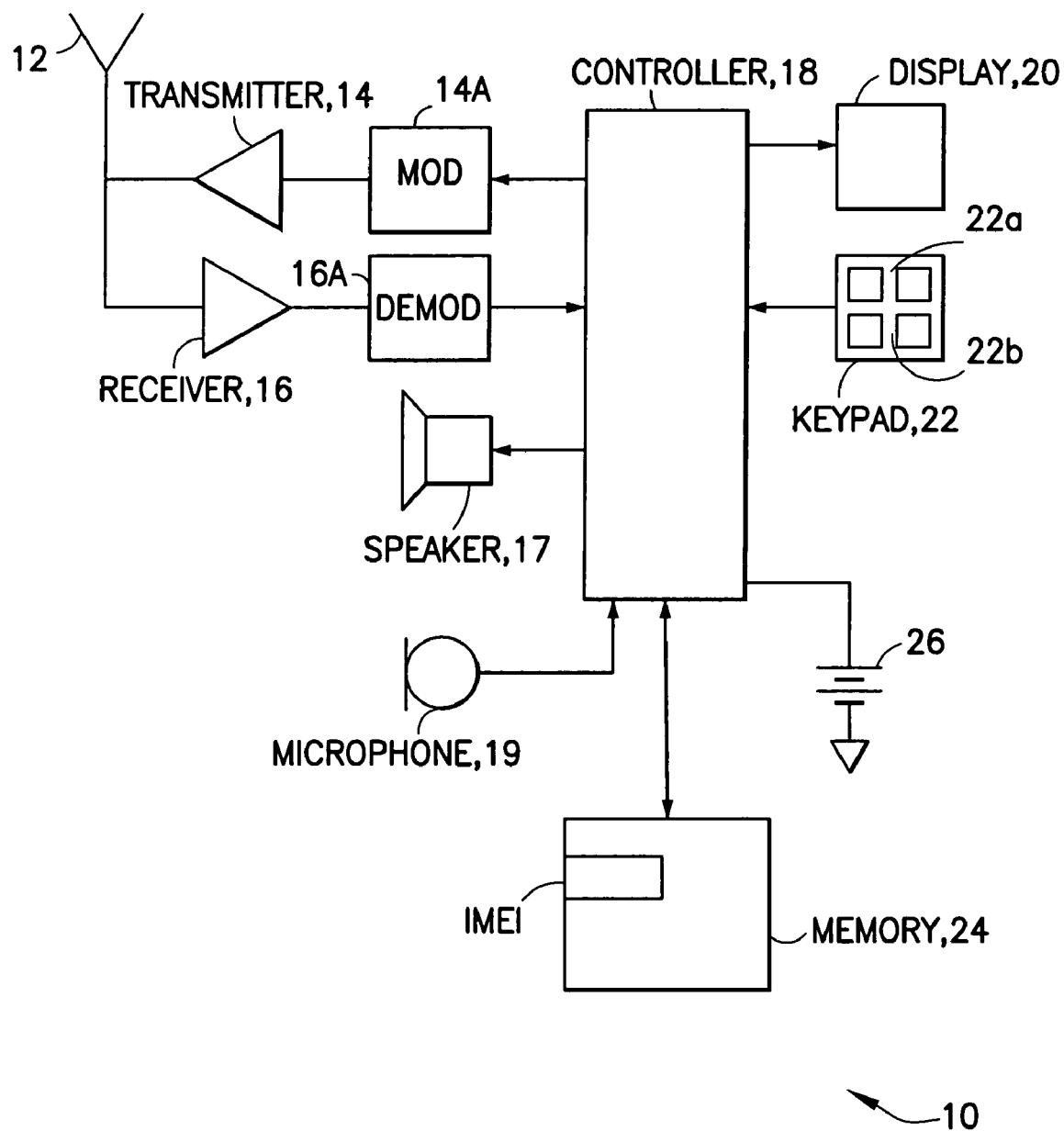
FIG. 1 is a block diagram of a mobile station that is suitable for practicing this invention.
Figure 2:
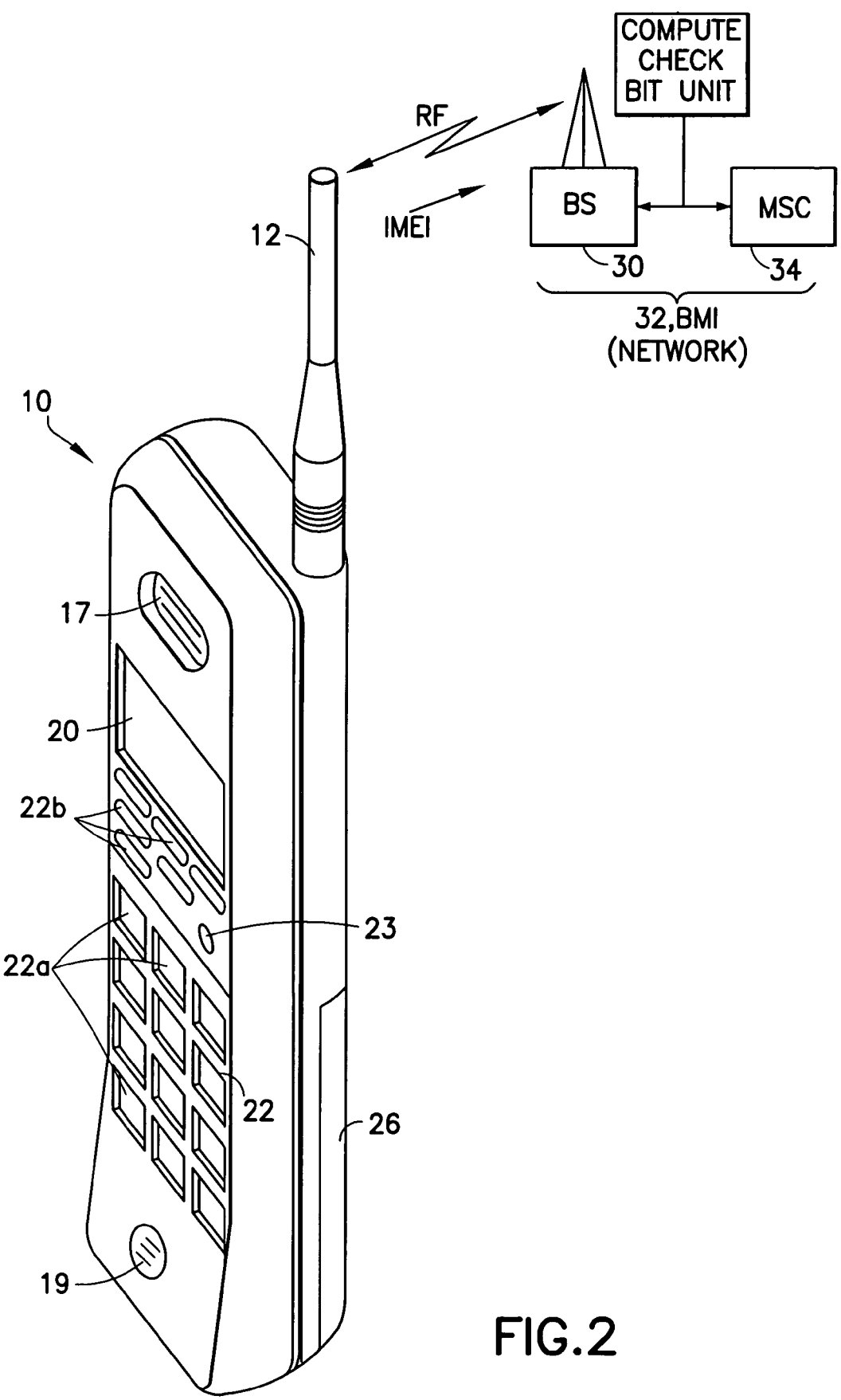
FIG. 2 is an elevational view of the mobile station shown in FIG. 1, and which further illustrates a wireless communication system and a service provider to which the mobile station is bidirectionally coupled through wireless RF links.

Reference is made to FIGS. 1 and 2 for illustrating a radiotelephone, also referred to herein as a wireless mobile station 10, that is suitable for practicing this invention. The mobile station 10 may be, but is not limited to, a cellular telephone or a personal communicator. The mobile station 10 includes an antenna 12 for transmitting signals to and for receiving signals from a base site or base station 30. The base station 30 may be a part of a network comprising a Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signaling information in accordance with the air interface standard of the applicable cellular system, and also user speech and/or user generated data. While the teachings of this invention can be readily applied to GSM-type TDMA mobile stations, these teachings could applied as well to code division/multiple access (CDMA) and other type of systems.

It is understood that the controller 18 also includes the circuitry required for implementing the audio (speech path) and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes a removable battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of wireless system parameters and the number assignment module (NAM). An operating program for controlling the operation of controller 18 is also stored in the memory 24 (typically in a ROM device). The operating program in the memory 24 includes routines to present messages and message-related functions to the user on the display 20, typically as various menu items.

The memory 24 is assumed to store the IMEI, and to be capable of transmitting the IMEI to the network, where a unit 35 operates to calculate the Check Digit (CD) in accordance with a method that is explained below and shown by example.

In accordance with the teachings herein the IMEI is modified so as to have at least a six digit hexadecimal (base 16) SNR representation, and the procedure executed by the unit 35 is modified to utilize the Luhn Algorithm so as to insure backwards compatibility with the existing installed base of mobile stations, having the six digit BCD SNR representation.

More particularly, the check digit calculating procedure is modified so that hexadecimal digits A, B, C, D, E and F are first converted to decimal digits 10, 11, 12, 13, 14 and 15, respectively, and the unit 35 then computes the check bit using the original check bit calculation algorithm (Luhn Algorithm).

Alternatively, the Luhn Algorithm may be modified to use base 16 for all calculations to derive a base 16 check digit.

Figure 3:
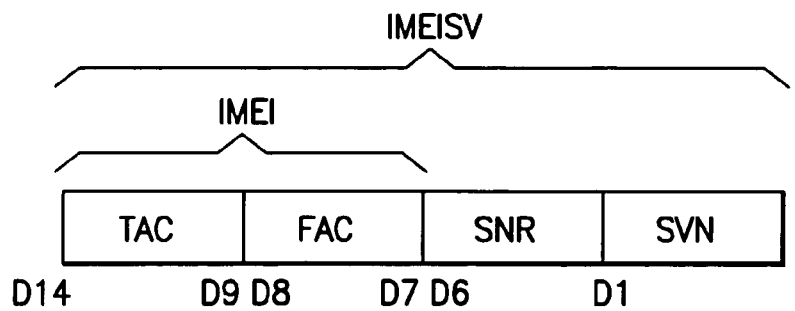
FIG. 3 shows the composition of the IMEI in accordance with these teachings.

Referring to FIG. 3, in accordance with the teachings herein, in a presently preferred embodiment the IMEI is modified to include a six digit hexadecimal Type Approval Code (TAC) field, which is issued by a central body, a two digit hexadecimal Final Assembly Code (FAC) field, which is encoded by the manufacturer, and a six digit hexadecimal Serial Number (SNR) field, which is assigned by the manufacturer to mobile stations in sequential order. An IMEISV is formed by concatenating the foregoing three fields with a two digit hexadecimal Software Version Number (SVN) field. The IMEI is complemented by a Check Digit. A modulus 16 Luhn Check Digit (CD) is computed over the 14-most significant hexadecimal digits of the IMEISV, that is, on the TAC, FAC and SNR fields, and not on the SVN field of the IMEISV.

The method for computing the Luhn check digit is defined in Annex B of the International Standard "Identification cards-Numbering system and registration procedure for issuer identifiers" (ISO/IEC 7812), incorporated by reference herein in its entirety as shown in FIG. 6. In accordance with an aspect of these teachings, the modulus 16 Luhn Check Digit is identical to the conventional procedure, except that the number base is transformed from base 10 to base 16.

An IMEI digit (D) labeling convention, excluding the SVN, is as follows:

TAC=D14 D13 . . . D9 (D9 is the least significant digit of TAC)

FAC=D8 D7 (D7 is the least significant digit of FAC)

SNR=D6 D5 . . . D1 (D1 is the least significant digit of SNR)

It should be noted that although all digits D1 through D14 are changed to use hexadecimal coding, in accordance with these teachings, this has no effect on the previously assigned values of these fields when the fields were originally assigned values using the conventional BCD coding. That is, the same code values can still be used for the previously assigned codes. The use of hexadecimal coding allows more codes to be used for all of the fields, especially the SNR field, which can now encode a total number of mobile station units, associated with a given TAC and FAC, of $2^{24}$=16,777,216. With the use of the conventional BCD coding only a maximum of one million units could be represented ($10^6$).

Figure 4:
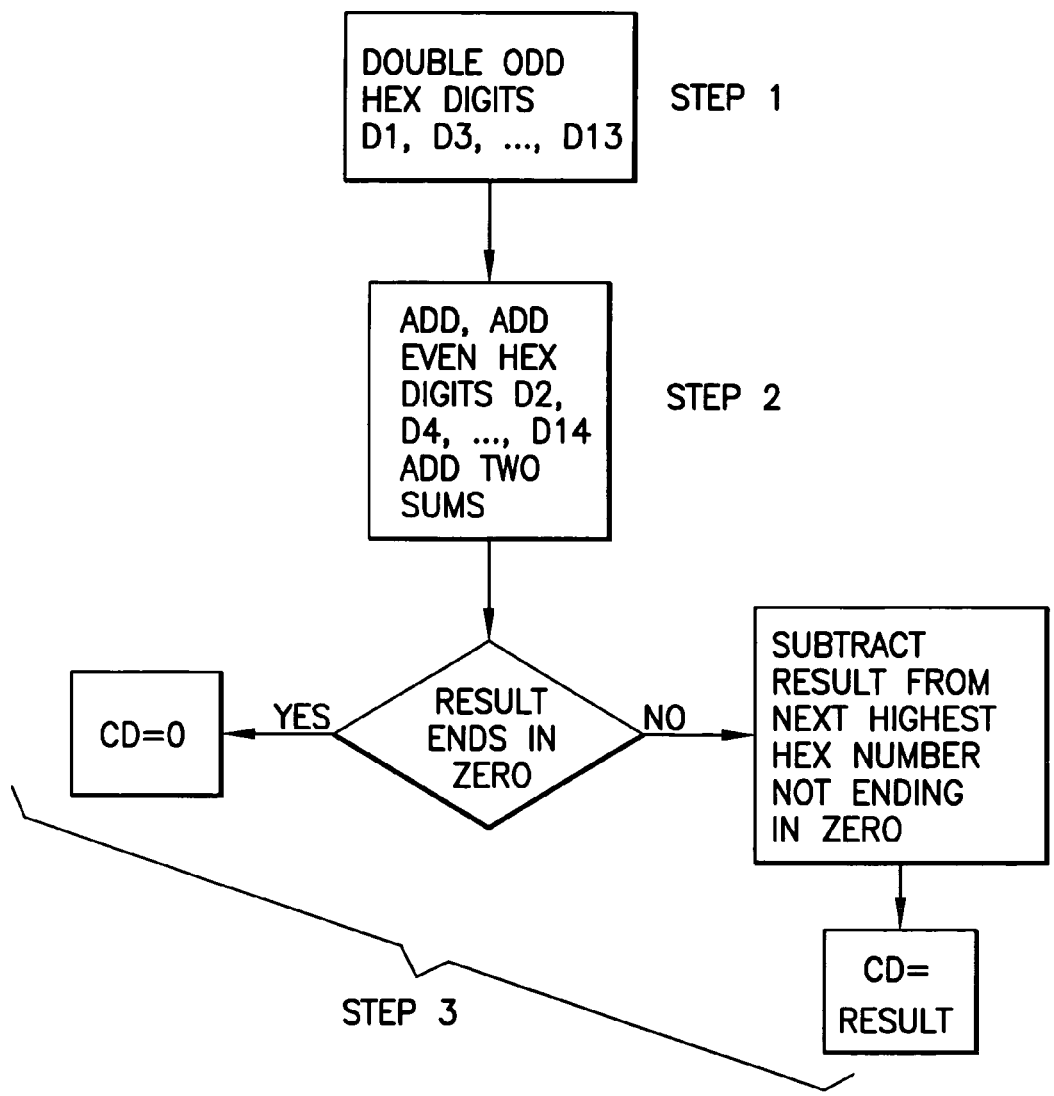
FIG. 4 is a logic flow diagram showing a method in accordance with the invention.

Referring now to FIG. 4, the computation of the check digit (CD) from the improved IMEI proceeds as follows:

Step 1: Double the values of the odd labeled digits D1, D3, D5, . . . , D13 of the IMEI using the hexadecimal number base.

Step 2: Add together the individual digits of the seven numbers obtained in Step 1, and then add this sum to the sum of all of the even labeled digits D2, D4, D6, . . . , D14 of the IMEI using the hexadecimal number base.

Step 3: If the number obtained at the end of Step 2 ends in zero (0), then set the CD to zero (0). If the number obtained at the end of Step 2 does not end in zero (0), then set the CD to be the difference between that number subtracted from the next highest hexadecimal number which does end in zero (0).

Figure 5:
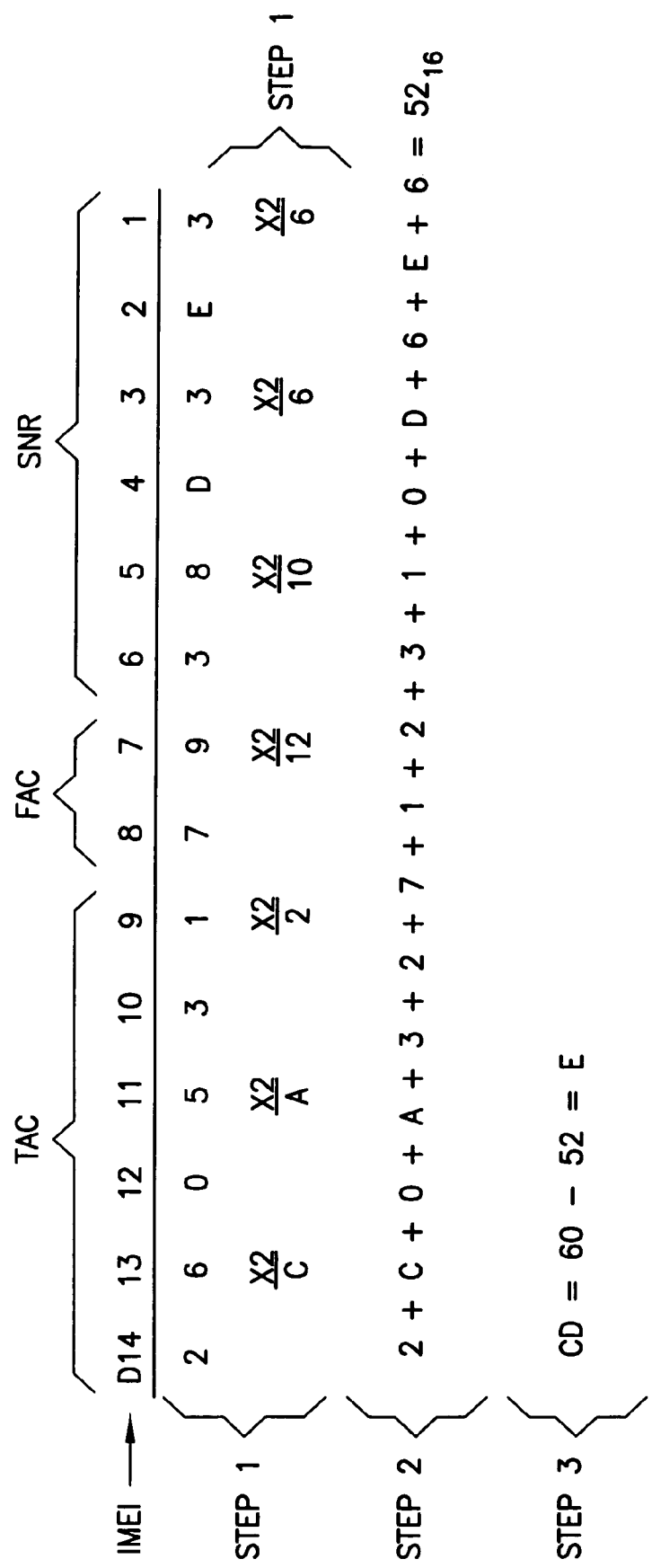
FIG. 5 presents an example of the calculation of the Check Digit in accordance with the method shown in FIG. 4, and further in accordance with the teachings of this invention.

FIG. 5 shows an example of the foregoing three steps applied to an exemplary IMEI having a value of $2605317938D3E3_{16}$, where the CD is calculated in Step 3 to be equal to $E_{16}$.

Although described in the context of preferred embodiments, it should be realized that a number of modifications to these teachings may occur to one skilled in the art.

Thus, while the invention has been particularly shown and described with respect to preferred embodiments thereof, it will be understood by those skilled in the art that changes in form and details may be made therein without departing from the scope and spirit of the invention.

What is claimed is:

1. A method for use with a mobile station of a type that stores a 14 digit International Mobile Equipment Identity (IMEI) code for generating a Check Digit (CD), comprising steps of:

executing a preliminary step of encoding the 14 digit (D1, D2, D3, . . . , D14) IMEI in a hexadecimal representation;

then computing the CD by, (A) doubling the values of the odd digits (D1, D3, D5, . . . , D13) of the IMEI using the hexadecimal number base;

(B) adding together the individual digits of the seven numbers obtained in Step A, and adding this sum to the sum of all of the even labeled digits (D2, D4, D6, . . . D14) of the IMEI using the hexadecimal number base; and (C) if the number obtained at the end of Step B ends in zero (0), setting the CD to zero (0), else if the number obtained at the end of Step B does not end in zero (0), setting the CD to be the difference between that number subtracted from the next highest hexadecimal number which does end in zero (0).

2. A method for use by a wireless communication system that includes a network and a plurality of mobile stations that each store a 14 digit International Mobile Equipment Identity (IMEI) code, the method generating a Check Digit (CD) and comprising steps of:

for a first type of mobile stations, executing a preliminary step of encoding the 14 digit (D1, D2, D3, . . . , D14) IMEI in a binary coded decimal (BCD) representation;

for a second type of mobile stations, executing a preliminary step of encoding the 14 digit (D1, D2, D3, . . . , D14) IMEI in a hexadecimal representation, then computing the CD in the network, regardless of whether an IMEI is received from the first type of mobile station or from the second type of mobile station, by performing the steps of, (A) doubling the values of the odd digits (D1, D3, D5, . . . , D13) of the IMEI using the hexadecimal number base;

(B) adding together the individual digits of the seven numbers obtained in Step A, and adding this sum to the sum of all of the even labeled digits (D2, D4, D6, . . . , D14) of the IMEI using the hexadecimal number base; and (C) if the number obtained at the end of Step B ends in zero (0), setting the CD to zero (0), else if the number obtained at the end of Step B does not end in zero (0), setting the CD to be the difference between that number subtracted from the next highest hexadecimal number which does end in zero (0).

* * * * *